United States Patent [19]
Hirano et al.

[11] Patent Number: 6,103,412
[45] Date of Patent: Aug. 15, 2000

[54] POLYMER ELECTROLYTE FUEL CELL

[75] Inventors: Shinichi Hirano, Yokohama; Futoshi Fujikawa, Tokyo, both of Japan

[73] Assignee: Mazda Motor Corporation, Hiroshima-ken, Japan

[21] Appl. No.: 09/076,101

[22] Filed: May 12, 1998

[30] Foreign Application Priority Data

May 13, 1997 [JP] Japan ................................ 9-121982
Mar. 27, 1998 [JP] Japan ................................ 10-080720

[51] Int. Cl.$^7$ ........................... H01M 8/04; H01M 8/10; H01M 2/00
[52] U.S. Cl. ................. 429/24; 429/30; 429/33; 429/34
[58] Field of Search ................ 429/22, 24, 30, 429/33, 34

[56] References Cited

U.S. PATENT DOCUMENTS

| | | | |
|---|---|---|---|
| 3,455,743 | 7/1969 | Huebscher et al. | 429/24 |
| 4,722,873 | 2/1988 | Matsumura | 429/24 |
| 4,973,530 | 11/1990 | Vanderborgh et al. | 429/34 X |
| 5,234,777 | 8/1993 | Wilson. | |
| 5,441,819 | 8/1995 | Voss et al.. | |
| 5,853,910 | 12/1998 | Tomioka et al. | 429/24 X |

FOREIGN PATENT DOCUMENTS

| | | |
|---|---|---|
| 60007068 | 1/1985 | European Pat. Off.. |
| 0 631 337 A2 | 12/1994 | European Pat. Off.. |
| 0 718 903 A1 | 6/1996 | European Pat. Off.. |

OTHER PUBLICATIONS

H.H. Voss, D.P. Wilkinson, P.G. Pickup, M.C. Johnson and V. Basura; Anode Water Removal: A Water Management and Diagnostic Technique for Solid Polymer Fuel Cells, Electrochimica Acta. vol. 40 No. 3 pp 321–328, 1995. (No Month).

S. Miachon, P. Aldebert; Internal hydration $H_2/O_2$ 100 $cm^2$ polymer electrolyte membrane fuel cell, Journal of Power Sources; received Dec. 28, 1994, revised Feb. 16, 1995, accepted Feb. 18, 1995, pp. 31–36.

Renaut Mosdale, Gérard Gebel, Michel Pineri, Water profile determination in a running proton exchange membrane fuel cell using small–angle neutron scattering, Journal of Membrane Science, 118 (1996), pp. 269–277. (No Month).

Mahlon S. Wilson, Judith A. Valerio and Shimshon Gottesfeld, Low Platinum Loading Electrodes for Polymer Electrolyte Fuel Cells Fabricated Using Thermoplastic Ionomers, Electrochimica Acta. vol. 40 No. 3 pp. 355–363, 1995. (No Month).

Renaut Mosdale and Supramaniam Sprinivasan, Analysis of Performance and of Water and Thermal Management in Proton Exchange Membrane Fuel Cells, Electrochimica Acta. vol. 40 No. 4, pp. 413–421, 1995 (No Month).

European Search Report, Application No. EP 98 10 8642 dated Jul. 30, 1998.

*Primary Examiner*—Donald R. Valentine
*Attorney, Agent, or Firm*—Nixon Peabody LLP; Donald R. Studebaker

[57] ABSTRACT

A polymer electrolyte fuel cell comprising a polymer electrolyte membrane, an anode catalytic electrode disposed at one side of the polymer electrolyte membrane, a fuel gas being supplied to the anode catalytic electrode, a cathode electrode disposed at another side of the polymer electrolyte, an oxidation gas being supplied to the cathode catalytic electrode, control means for controlling a reduction amount of water from the cathode electrode accompanying with the oxidation gas to a sum of a water amount increased at the cathode electrode transported from the anode electrode through the polymer electrolyte membrane during a redox reaction of the fuel cell and a water amount produced by an oxidation reaction in the cathode electrode. A compact fuel cell system with a high cell performance can be accomplished.

34 Claims, 9 Drawing Sheets

WATER TRANSPORTATION RATIO BASED ON NET FLUX OF WATER PER MOLE OF ELECTRONS

| °C | SATURATION VAPOR PRES. atm | SATURATION VAPOR PRES. mmHg | Jm | Ja(max) a=0.5 | Jm+Jw | Jc(max) c=0.5 |
|---|---|---|---|---|---|---|
| 40 | 0.0728 | 55.33 | 0.10 | 0.05 | 0.60 | 0.13 |
| 50 | 0.1218 | 92.57 | 0.10 | 0.09 | 0.60 | 0.22 |
| 60 | 0.1966 | 149.42 | 0.10 | 0.15 | 0.60 | 0.38 |
| 70 | 0.3076 | 233.78 | 0.10 | 0.26 | 0.60 | 0.64 |
| 80 | 0.4674 | 355.22 | 0.09 | 0.45 | 0.59 | 1.13 |
| 90 | 0.6919 | 525.84 | 0.09 | 0.86 | 0.59 | 2.14 |

ELECTROLYTE: Aciplex-1002
HYDROGEN PRESSURE: 0.15MPa
AIR PRESSURE: 0.15MPa

POLYMER ELECTROLYTE FUEL CELL

BACKGROUND OF THE INVENTION

1 Field of the Invention

The present invention relates to a polymer electrolyte fuel cell, in particular, a water supply to a polymer electrolyte membrane of the fuel cell.

2. Related Art

A polymer electrolyte fuel cell is possible to be operated around the atmospheric temperature to accomplish a high energy conversion efficiency and power output efficiency or a cell performance. As a result, the polymer electrolyte has been highlighted recently as a movable power resource or power source of an electric automobile.

The polymer electrolyte fuel cell comprises an electricity generating element constituted by sandwiching a polymer electrolyte membrane having a hydrogen ion conductivity with carbon electrolytes carrying platinum catalyst, or a polymer electrolyte membrane-electrolyte joinder. Then, gas passages are formed across each surface of the electrodes for supplying reaction gases therethrough respectively. The electricity generating element is supported by gas separators at opposite sides to form a laminated structure of the polymer electrolyte fuel cell. Then, a hydrogen gas or fuel gas is supplied to one of the electrodes and an oxygen gas or air, namely, oxidizing gas to the other electrodes to obtain an electro-chemical energy due to a redox reaction of the reaction gases as an electric energy directly. In this case, the hydrogen gas at an anode side is ionized and moved through the polymer electrolyte, on the other hand, the electron is moved to a cathode side through an external load to react with the oxygen to produce a water. Thus, the electric energy due to the electrochemical reaction can be taken out. The hydrogen ion is moved through the polymer electrolyte membrane accompanying a water molecule. Accordingly, if the polymer electrolyte membrane is dried out, the ion conductivity thereof will be remarkably reduced to thereby reduce the energy conversion efficiency. In view of this, in order to maintain a good ion conductivity, it is necessary to supply the water to the polymer electrolyte membrane. To this end, conventionally, there has been provided a humidifier for humidifying the fuel gas and oxidation gas.

Figure 1:
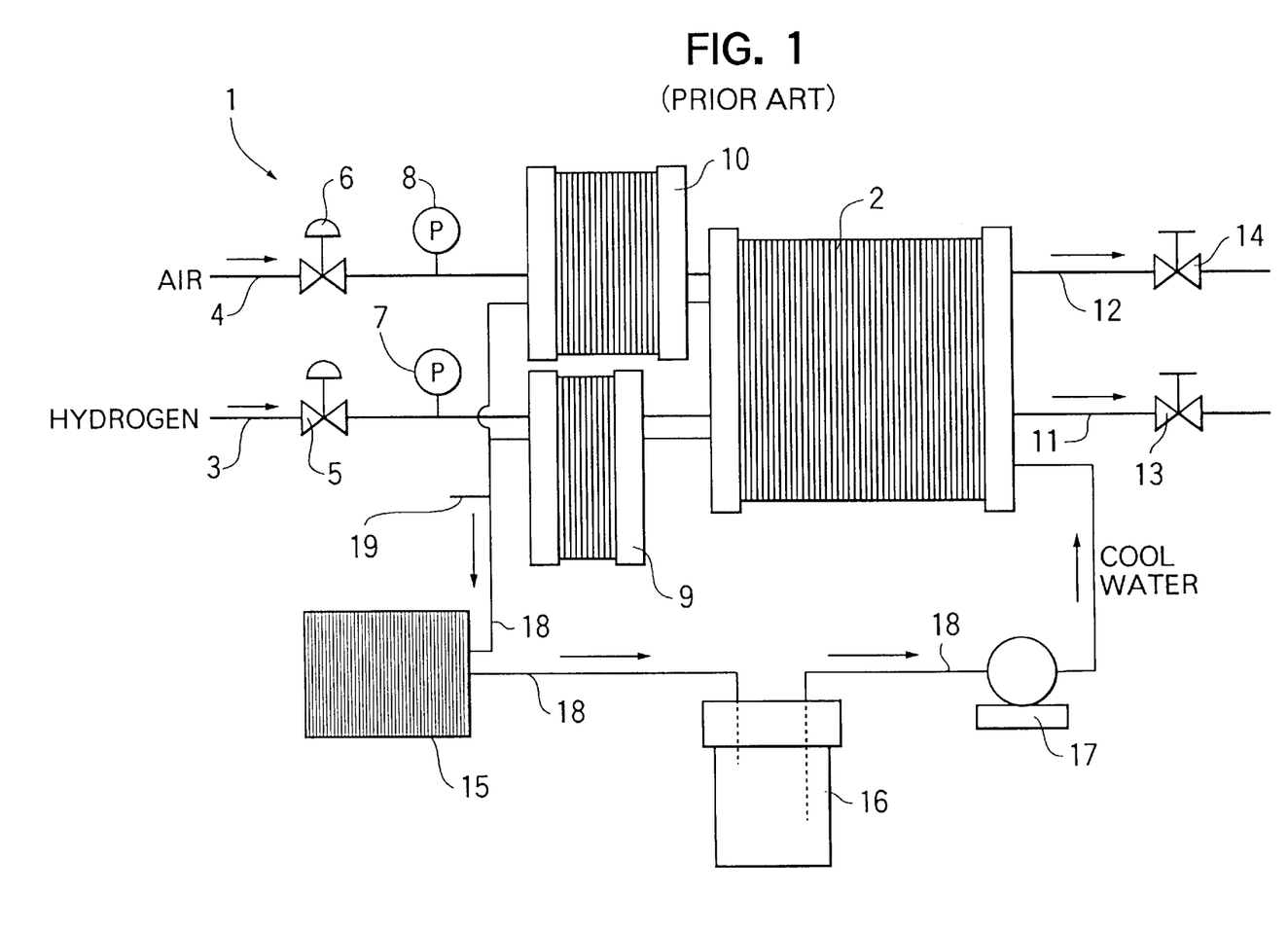
FIG. 1 is a schematic view of a conventional fuel cell system as a whole.

Taking reference with FIG. 1, there is shown a conventional fuel cell system 1 schematically.

In the system 1, there is provided a fuel cell stack 2 in which a plurality of the polymer electrolyte fuel cell unit are laminated. To the anode sides of the fuel cell stack 2 is supplied the hydrogen gas as a fuel gas through a supply tube 3. The air as an oxidation gas is supplied to the respective cathode sides of the stack 2 though an air supply tube 4. In order to control pressures of the hydrogen and air , regulators 5 and 6 are provided. Pressure indicators 7 and 8 are provided for detecting the supply pressures. In addition, there are provided hydrogen and air humidifiers 9 and 10 respectively for humidifying the supply gases in the respective gas supply systems so that the supply gases accompanying certain humidity are supplied to the stack 2.

In addition, flow control valves 13 and 14 are provided in air and hydrogen exhaust tubes 11 and 12 from the fuel cell stack 2.

The fuel cell system 1 is provided with a temperature control mechanism for controlling the temperature in the system by means of the supply of a cooling water to the stack 2. The temperature control mechanism includes a heat exchanger 15, cooling water tank 16 and a cooling water circulation pump 17. A thermocouple 19 is disposed in a cooling water circulation line 18 to measure the temperature therein. Meanwhile, when the air is employed for the oxidation gas, an air compressor (not shown) is necessary for pressurizing the air to a desirable pressure.

When the fuel cell is desired to apply for the power source of a vehicle as the automobile, a compact fuel cell system is required to save a space. In this case, it is necessary to provide a compact fuel cell system including the peripheral systems such as the air compressor, and humidifier as a whole.

Therefore, an object of the invention is to provide a compact fuel cell system.

In particular, an object of the invention is to provide a compact fuel cell system as whole by providing a compact humidifier for the oxidation gas.

The above and other objects of the present invention can be accomplished by a polymer electrolyte fuel cell comprising a polymer electrolyte membrane, an anode catalytic electrode disposed at one side of the polymer electrolyte membrane, a fuel gas being supplied to the anode catalytic electrode, a cathode electrode disposed at another side of the polymer electrolyte, an oxidation gas being supplied to the cathode catalytic electrode, control means for controlling a reduction amount of water from the cathode electrode together with the oxidation gas to a sum of a water amount increased at the cathode electrode by being transported from the anode electrode through the polymer electrolyte membrane during a redox reaction of the fuel cell and a water amount produced by an oxidation reaction in the cathode electrode.

Preferably, the polymer electrolyte membrane has a thickness from about 20–80 $\mu$m more preferably, about 20–50 $\mu$m.

In preferred embodiment, an operating temperature of the fuel cell is maintained from about 50° C. to 80° C., preferably 60° C.–70° C. As a result, the water level at the cathode side can be maintained at a desirable condition.

Preferably, the fuel gas is a hydrogen and the oxidation gas is an air. In the present invention, there is no humidifier for humidifying the oxidation gas, thus, a compact fuel cell system as a whole can be facilitated remarkably.

Preferably, a thickness of the catalyst layer in the electrolyte membrane is less than about 10 $\mu$m.

The polymer electrolyte membrane enable protons or hydrogen ions to be transported when it includes a sufficient water so that the an external electric circuit is formed. Thus, the fuel cell which performs an external work can be formed. Namely in order to form the fuel cell, the polymer electrolyte membrane is needed to contain a sufficient water. At the cathode electrode of the polymer electrolyte, the water is produced due to the oxidation reaction. However, if the water product is excessive at the cathode electrode, the output performance of the fuel cell is deteriorated.

Accordingly, in order to maintain a desirable cell performance, the produced water is to be properly excluded from the cathode electrode and thus from the fuel cell system. In short, both a short water condition of the polymer electrolyte and an excessive water condition of the cathode electrode will deteriorate the output performance of the fuel cell system. In addition, the water amount contained in the fuel gas and the oxidation gas it to be maintained properly.

With regard to a water transportation in the polymer electrolyte, there are two types of the water transportation. one is a so called electrical osmotic flux in which a water is transported from the anode to cathode accompanying the proton transportation. The other is a reverse water diffusion flux in which the water is transported from the cathode to the anode. Accordingly, a water balance in the polymer electrolyte depends on the respective amounts of the electrical osmotic flux and the reverse diffusion flux. Generally, in order to balance the electrical osmotic flux with the reverse diffusion flux, it is necessary to humidify the hydrogen gas at the anode electrode to supply a certain amount of water. On the other hand, if the air is employed for the oxidation gas, the air of 2.5 times amount of the hydrogen flux in the anode side stoichiometrically. Thus, if the gas utilization rates are the same for the respective electrodes, the 2.5 times water accompanying the air is taken away from the cathode side compared with the anode side.

At the cathode side, the water is produced by the oxidation reaction and the electrical osmotic flux over the reverse diffusion flux is flew in and increased compared with the anode side. However, the gas flow in the cathode side are greater than the anode side. As a result, a water shortage condition is produced in the cathode side. Conventionally, the humidifier is provided for dealing with this water shortage condition in the cathode side.

The inventors of the present invention found that a desirable output performance of the fuel cell can be maintained regardless of the omission of the air humidifier of the air.

Figure 2:
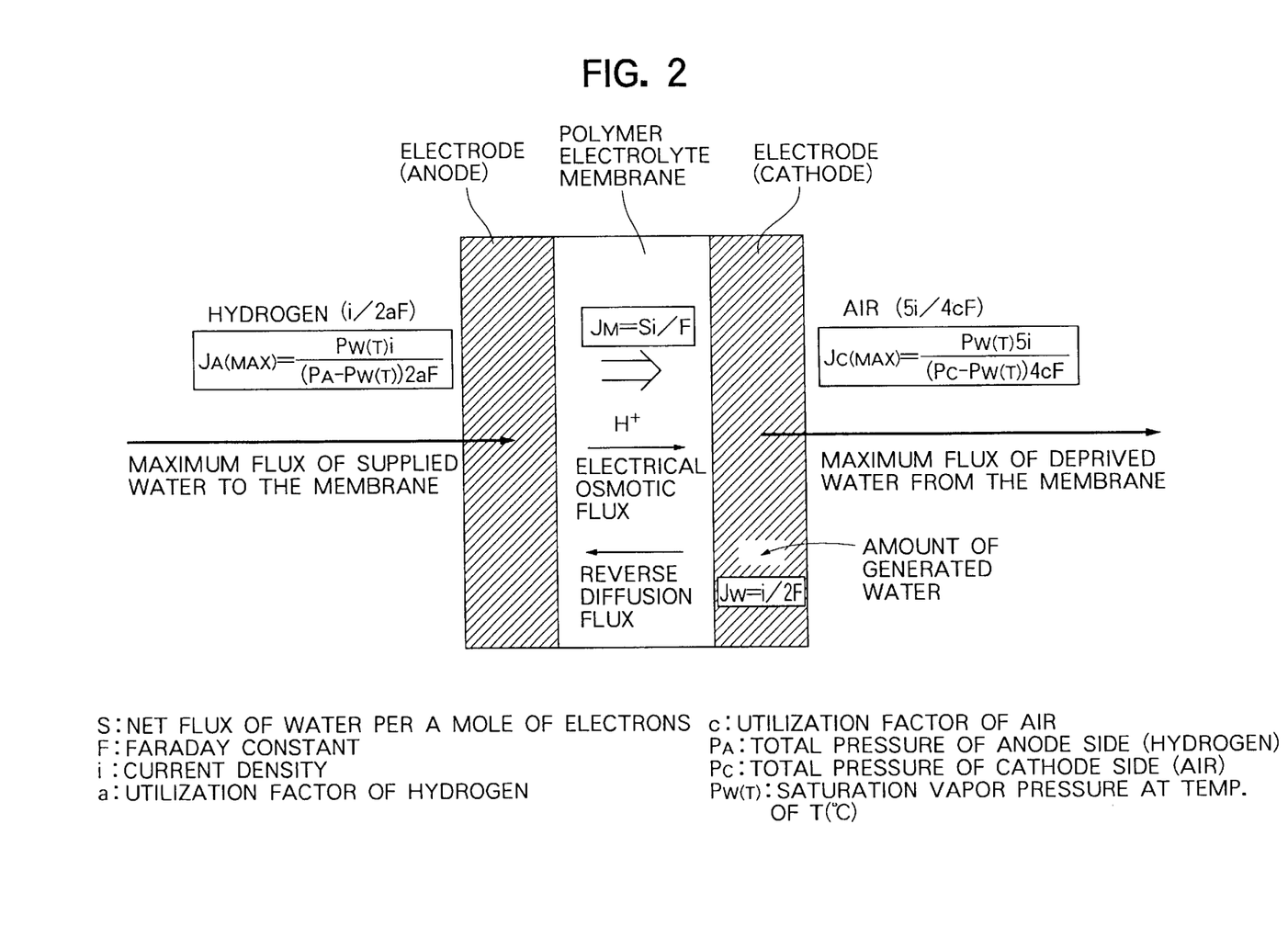
FIG. 2 is a view for explaining a water transportation model in the fuel cell.

There is shown a model a water transportation on the polymer electrolyte membrane. The amount of the water transportation in the polymer electrolyte membrane is a difference between the electrical osmotic flux and the reverse diffusion flux and thus can be expressed by the following equation.

$$J_M = Si/F \quad (F: \text{Faraday constant}) \quad (1)$$

wherein $J_M$: Amount of water transportation through the membrane

S: Net flux of water per a mole of electrons i: Current density

The water amount produced in the cathode side $J_W$ can be expressed as;

$$J_W = i/2F \quad (2)$$

Maximum flux of supplied water to the membrane at the anode side $J_{A(MAX)}$ can be shown by the following equation.

$$J_{A(MAX)} = (P_{W(T)}/(P_A - P_{W(T)}))i/2aF \quad (3)$$

Wherein a: Utilization factor of hydrogen $P_A$: Hydrogen supply pressure $P_{W(T)}$: Saturation vapor pressure at temp. of T(° C.)

Maximum amount $J_{C(MAX)}$ of the water amount taken away from the cathode side can accompanying the air $J_C$ can be expressed as follows:

$$J_{C(MAX)} = (P_{W(T)}/(P_C - P_{W(T)}))5i/4cF \quad (4)$$

Wherein c: Utilization factor of air $P_C$: Air supply pressure.

During the redox reaction of the fuel cell, it is crucial that the sum of the water transportation amount $J_M$ from the anode side to the cathode side through the polymer electrolyte membrane and the water amount produced in the cathode electrode $J_W$ due to the oxidation reaction is balanced with the water amount $J_C$ taken away from the cathode side accompanying the air. It is also crucial that the water amount $J_M$ transported through the polymer electrolyte is balanced with the water supply amount $J_A$ to the anode side.

If the water amount $J_C$ taken away from the cathode is greater than the sum of the water transportation amount $J_M$ and the produced water amount $J_W$, it is impossible to maintain a desirable water amount at the cathode side. Namely, a dry out phenomenon occurs at the cathode side.

If the water supply amount $J_A$ to the anode side is smaller than the water transportation amount $J_M$, the dry out phenomenon occurs at the anode side.

In both cases, the cell performance is deteriorated.

The maximum amount $J_{C(MAX)}$ of the water amount taken away from the cathode side accompanying the air $J_C$ and the maximum flux $J_{A(MAX)}$ of supplied water $J_A$ to the membrane at the anode side are the saturated vapor water amounts respectively at a temperature. Thus, the maximum amounts $J_{C(MAX)}$ and $J_{A(MAX)}$ depend on the temperature and thus as the temperature increases, they increase remarkably. Similarly, the amounts $J_C$ and $J_A$ also increase remarkably as the temperature increases. As a result, where the temperature of the air supply is high, the dry out tends to occur at the cathode side. In order to prevent such dry out, it is desirable to operate the fuel cell at a low temperature so that the humidification amount of the air can be reduced. Where the temperature of the supply gas is low, the supply water amount $J_A$ and the transportation water amount $J_M$ are substantially balanced at the anode side. Where the temperature decreases beyond a certain level, the supply water amount $J_A$ becomes smaller than the water transportation amount $J_M$ and thus the dry out problem occurs.

Meanwhile, as the thickness of the polymer electrolyte membrane is reduced, the reverse diffusion flux is increased. Thus, the transportation water amount is reduced as a whole. It is considered that this is because a gradient of the water density becomes abrupt in the membrane between the anode and cathode sides. Accordingly, it is desirable to reduce the thickness of the membrane in order to prevent the dry out at the anode side which is caused due to the reduction of the water supply amount $J_A$ at the anode side during the low temperature operation.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

Figure 3:
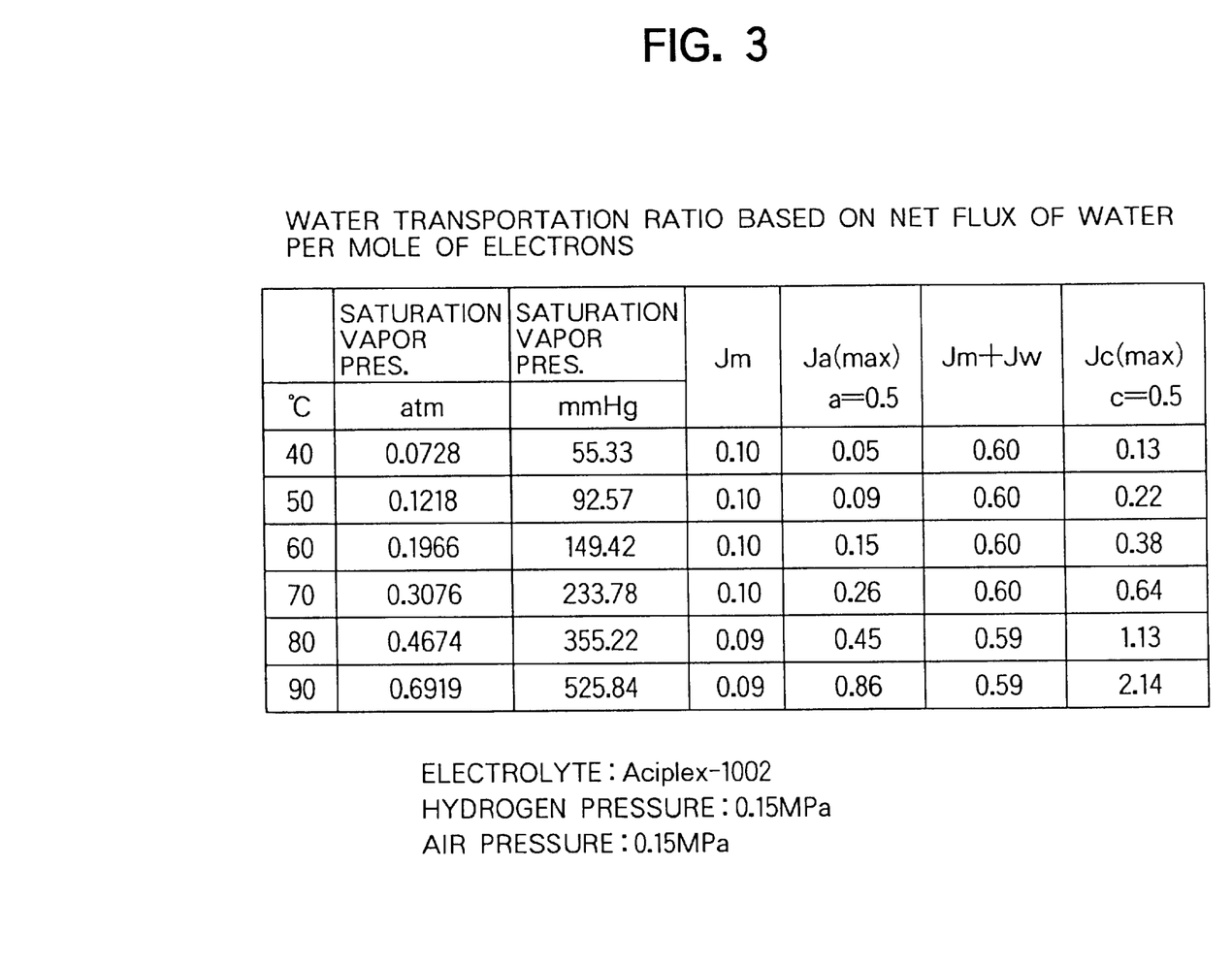
FIG. 3 is a view showing a temperature dependency of the water transportation amount.

Referring to FIG. 3, there are shown relationships between the water transportation amount $J_M$, the maximum water supply amount $J_{A(MAX)}$ at the anode side and the maximum water amount $J_{C(MAX)}$ removed from the cathode side with regard to the temperature.

The water transportation amount was obtained based on the net flux of water per mole of electrons S which is cited from an article entitled as "a water transportation during an operation of the polymer electrolyte fuel cell" by Mizuhata et al. Collections of Abstracts of The 61th Meeting of Electro-Chemical Association in 1994. The value of S below 60° C. is substituted by the value S at 70° C.

From these relationships, it is found that a desirable water balance in the fuel cell can be obtained at a temperature lower than about 80° C., preferably at around 70° C. In this case, a temperature lower than about 50° C. would cause the dry out at the anode side due to the fact that the maximum water supply amount $J_{A(MAX)}$ at the anode side is less than the water transportation amount $J_M$. Thus, it is desirable to operate the fuel cell between about 50° C. and 80° C.

Thickness of the polymer electrolyte membrane

Figure 4:
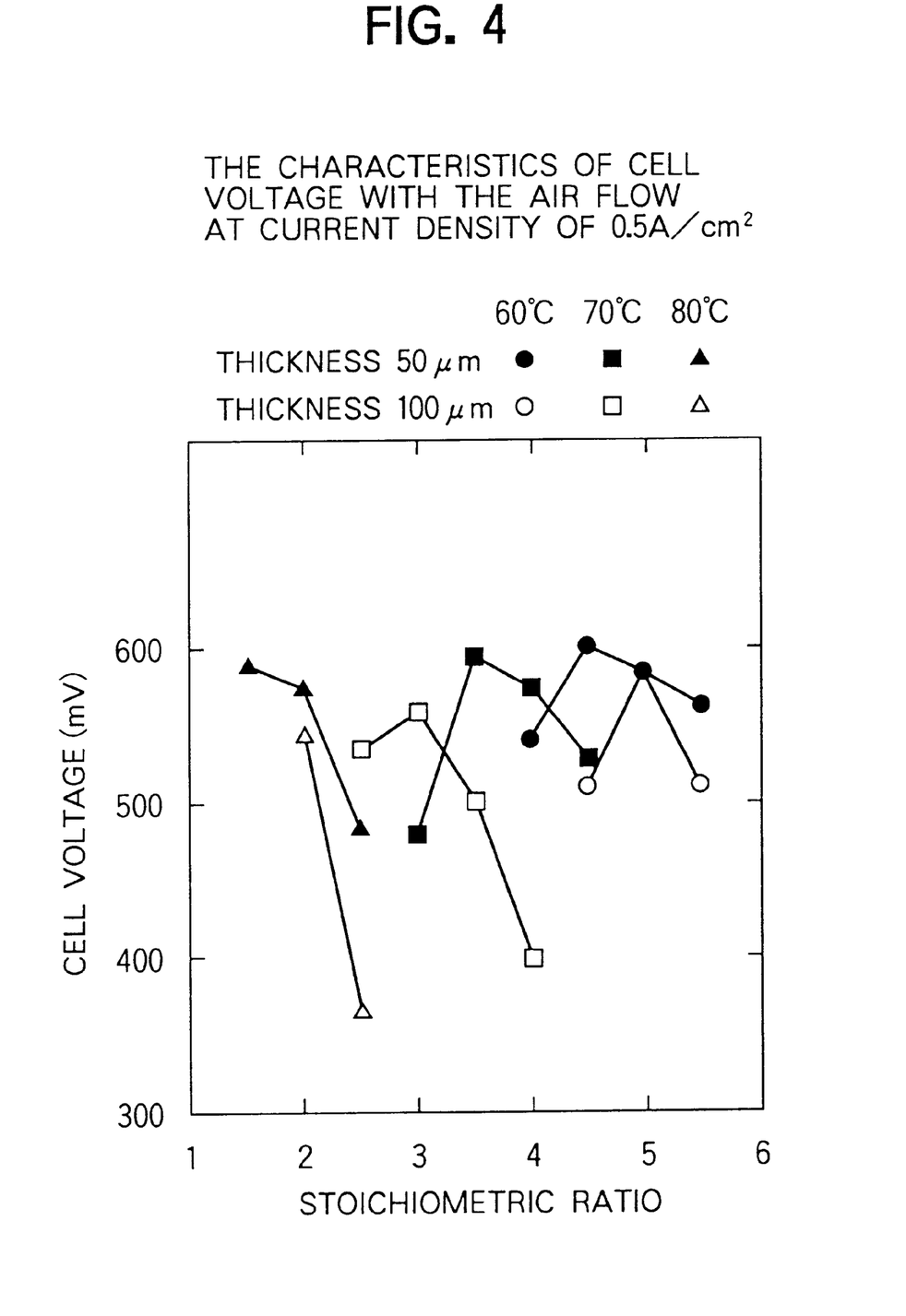
FIG. 4 is a view showing an output voltage characteristic of the fuel cell as the operating temperature and the gas flow rate are changed.

Referring to FIG. 4, it is shown a fuel cell output characteristics as the air supply amount and the operating condition are changed. Membranes with the thickness of 100 and 50 μm are employed. The current density is 5 A/cm² and the fuel cell output characteristics is provided as a cell output voltage for a single fuel cell structure.

According to FIG. 4, the membrane with 50 μm thickness exerts a greater output voltage or as the membrane is thin, the fuel cell generates a greater voltage. As the operating temperature increases, the cell performance is reduced. This is because the dry out would occurs at the cathode side. As aforementioned, it is easy to establish the water balance between the anode side and the cathode side as the membrane becomes thin. Therefore, in this respect, it is desirable to make the membrane thin. However, if the membrane thickness is smaller than about 20 μm, there would occur a substantial gas leak across the membrane. As a result, the cell performance is deteriorated. Thus, it would be desirable that the thickness of the membrane is ranged from about 20 μm to 80 μm, preferably 20 μm to 50 μm.

Figure 5:
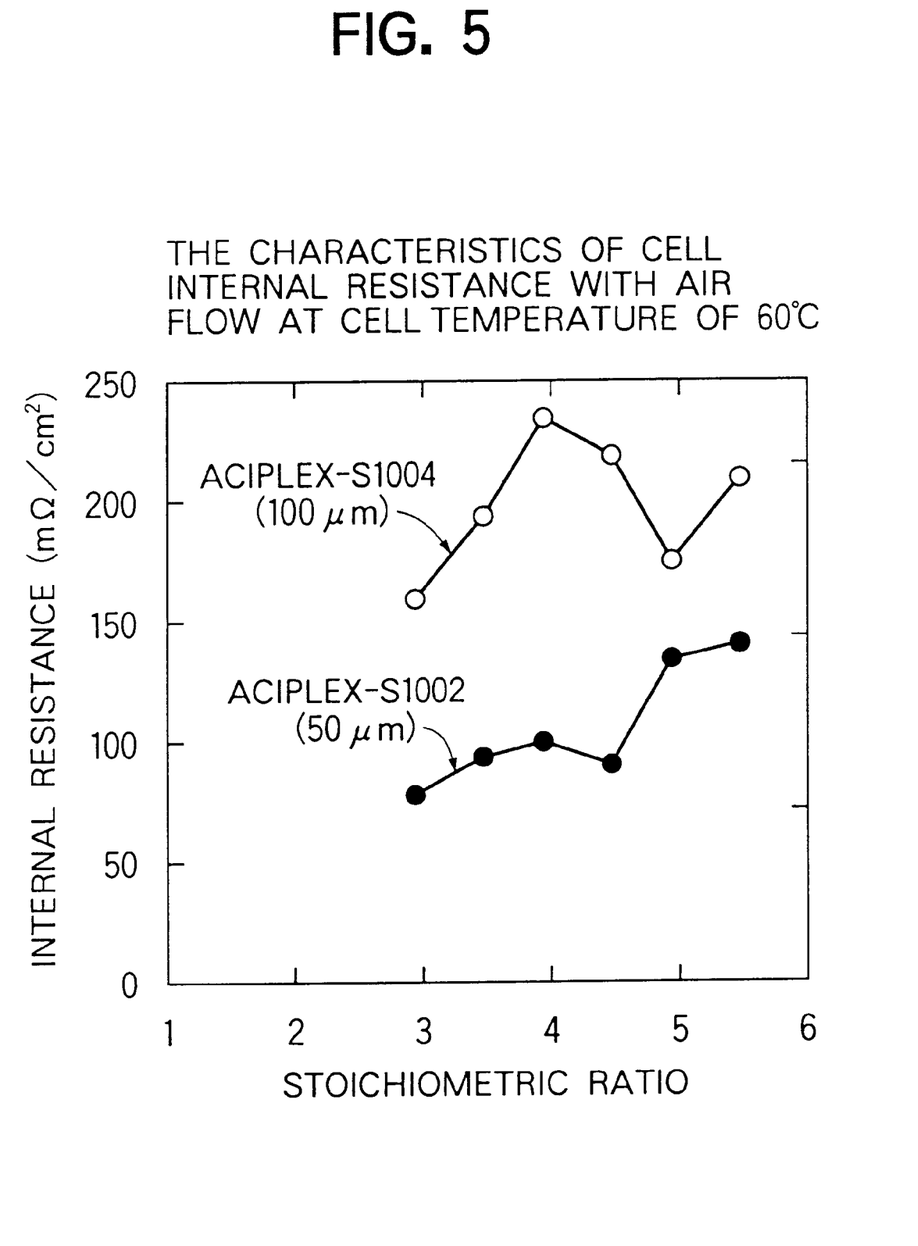
FIG. 5 is a view showing an internal resistance characteristic of the polymer electrolyte membrane as the gas flow rate is changed.

FIG. 5 shows the change of the internal resistance of the fuel cell as the gas flow rate is changed at the operating temperature 60° C. of the fuel cell. It is found that as the membrane becomes thin, the internal resistance gets reduced and thus preferable to the fuel cell.

Thickness of the catalyst layer

The cell performance depends on how high voltage can be produced. This can be accomplished by suppressing an overpotential of mass transport region due to a higher current density. The overpotential can be suppressed by reducing the thickness of a reaction region or catalyst layer and can enhance the limiting current density.

By reducing the thickness of the reaction region, a higher reaction efficiency and higher cell performance can be maintained even under a lower partial pressure of oxygen. In other words, it is possible to operate the fuel cell system with a low air compression condition and reduce a driving power of an air compressor. According to the research of the present inventors, a desirable cell performance can be obtained when the catalyst layer has about 10 μm in thickness. The catalyst layer can be formed by carrying platinum catalytic particles of about 2–4 nm in size or diameter on carbon black particles of about 100 nm in size, or diameter.

Where the catalyst layer has about 10 micron in thickness, the weight ratio of platinum particles to the carbon black is about 2 to 1. As the catalyst gets thin, the weight ratio of the platinum catalytic particles increases. However, while the platinum catalytic particles are maintained at the desirable sizes as mentioned above, the catalyst layer is formed. In this case, the weight ratio of the platinum to the carbon black is at most about 60%.

In view of this, a limit thickness of the catalyst layer would be about 10 μm. A smaller catalyst layer will not be able to maintain the desirable size ranges of the platinum particles.

Where the catalyst layer is formed with about 10±about 5 μm in thickness and the total polymer electrolyte membrane is formed with about 20±about 10 μm, the fuel cell can be operated with about 0.15 MPa of the reaction gas pressure without deteriorating the cell performance. Such material for forming the catalyst layer with about 10 μm can be available from Japan Goretex Incorporated in Japan.

Fuel cell system of a preferred embodiment

Figure 6:
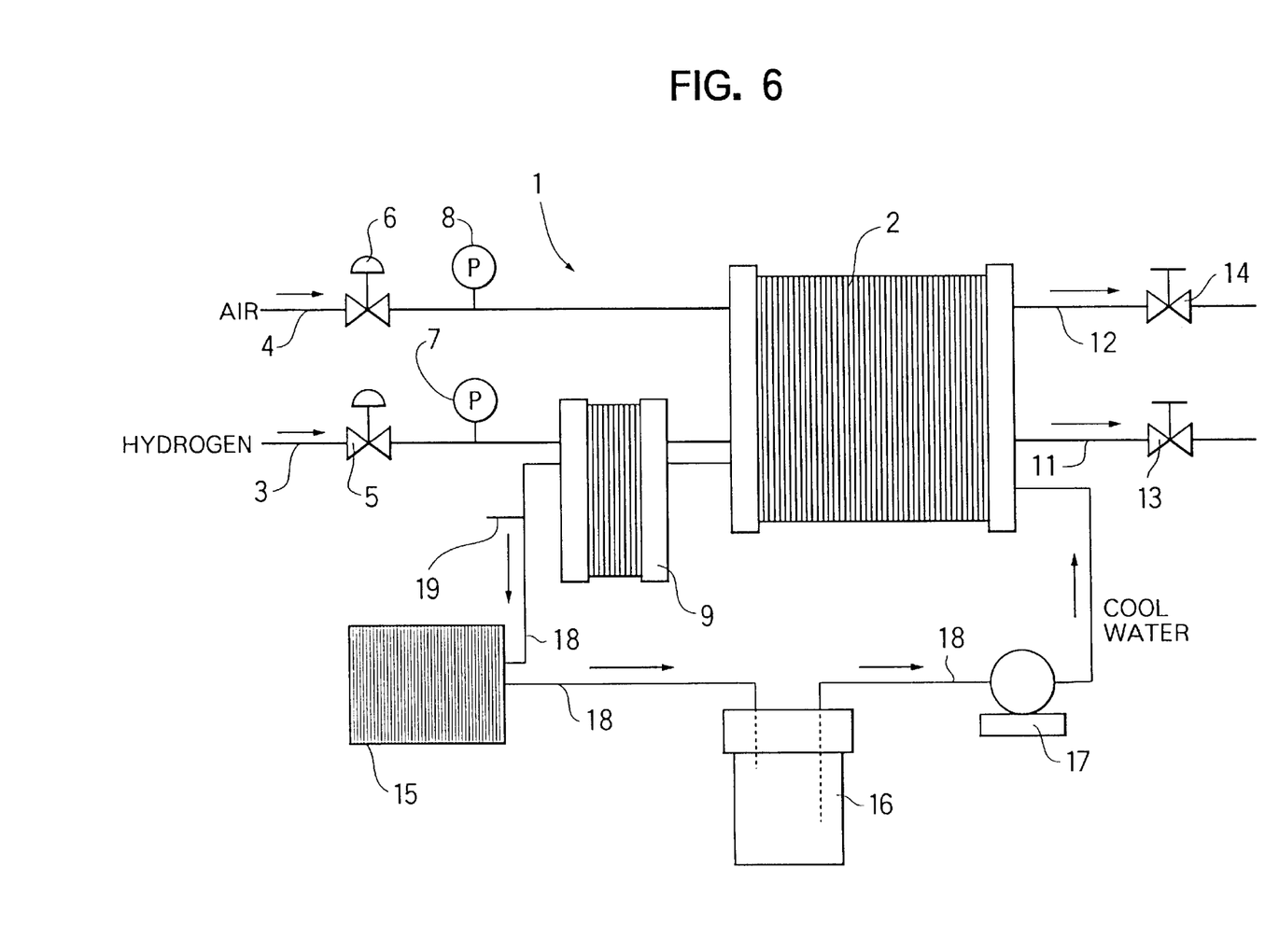
FIG. 6 is a schematic view of a fuel cell system in accordance with the present invention.

FIG. 6 shows a schematic view of a fuel cell system in accordance with a preferred embodiment of the present invention similar to FIG. 1.

The fuel cell system shown in FIG. 6 is the same as FIG. 1 except that the fuel cell in FIG. 6 is not provided with the air humidifier.

Figure 7:
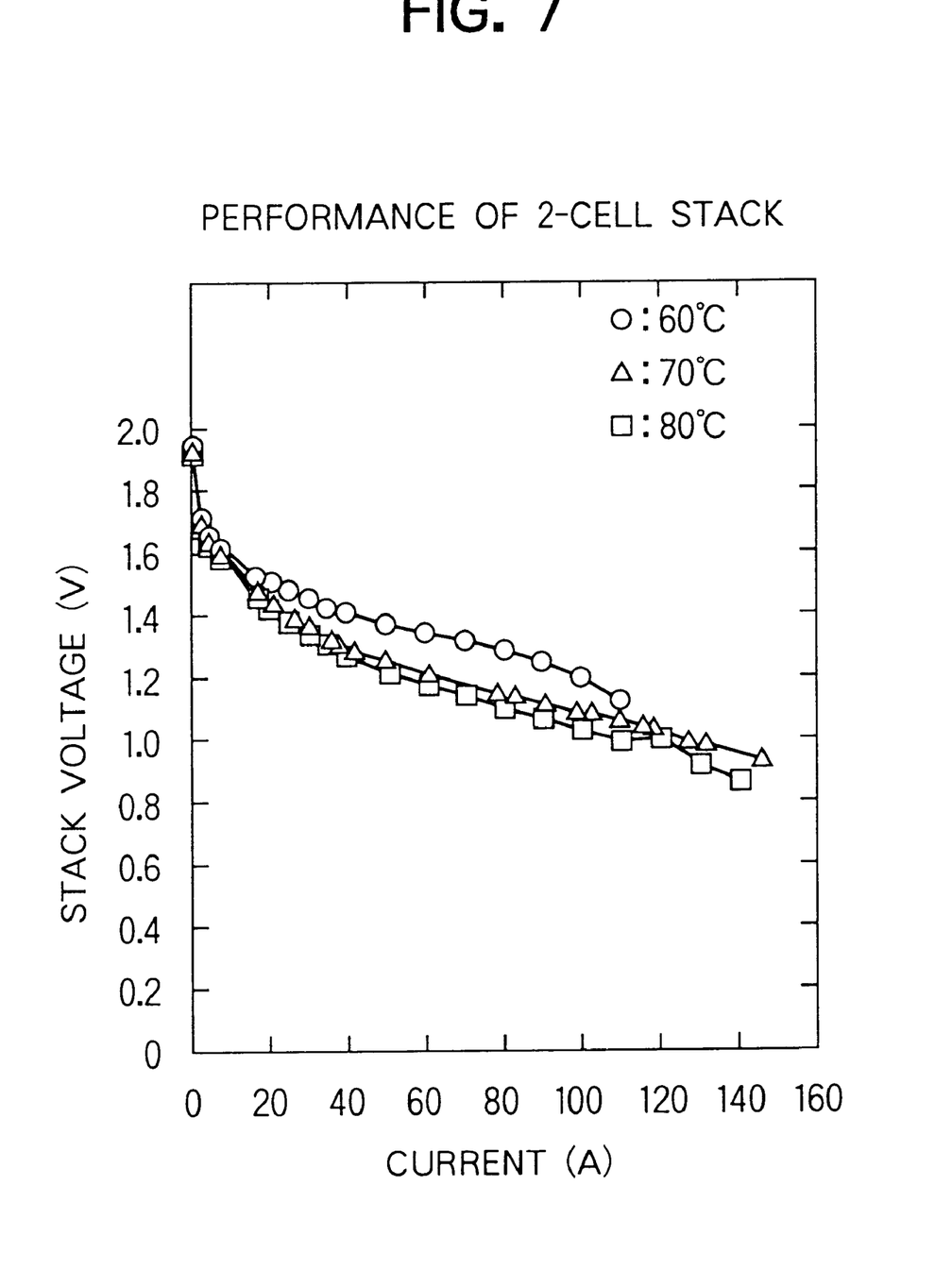
FIG. 7 is a view showing a relationship between the electric current and the fuel cell output characteristics as the operating temperature is changed.

FIG. 7 shows fuel cell characteristics or cell performance of the fuel cell system according to the present invention as shown in FIG. 6 as the operating temperature is changed.

In this embodiment, the polymer electrolyte membrane has about 20 μm.

Based on the result of FIG. 6, it is found that as the operating temperature decreases, the cell performance is improved. In particular, as the operating temperature increases, the cell performance is deteriorated in a low current density range. In the low current density range, a stoichiometric flux is reduced, and thus the air utilization factor is relatively reduced to increase the water amount taken away from the cathode side. This causes the dry out at the cathode side.

Figure 8:
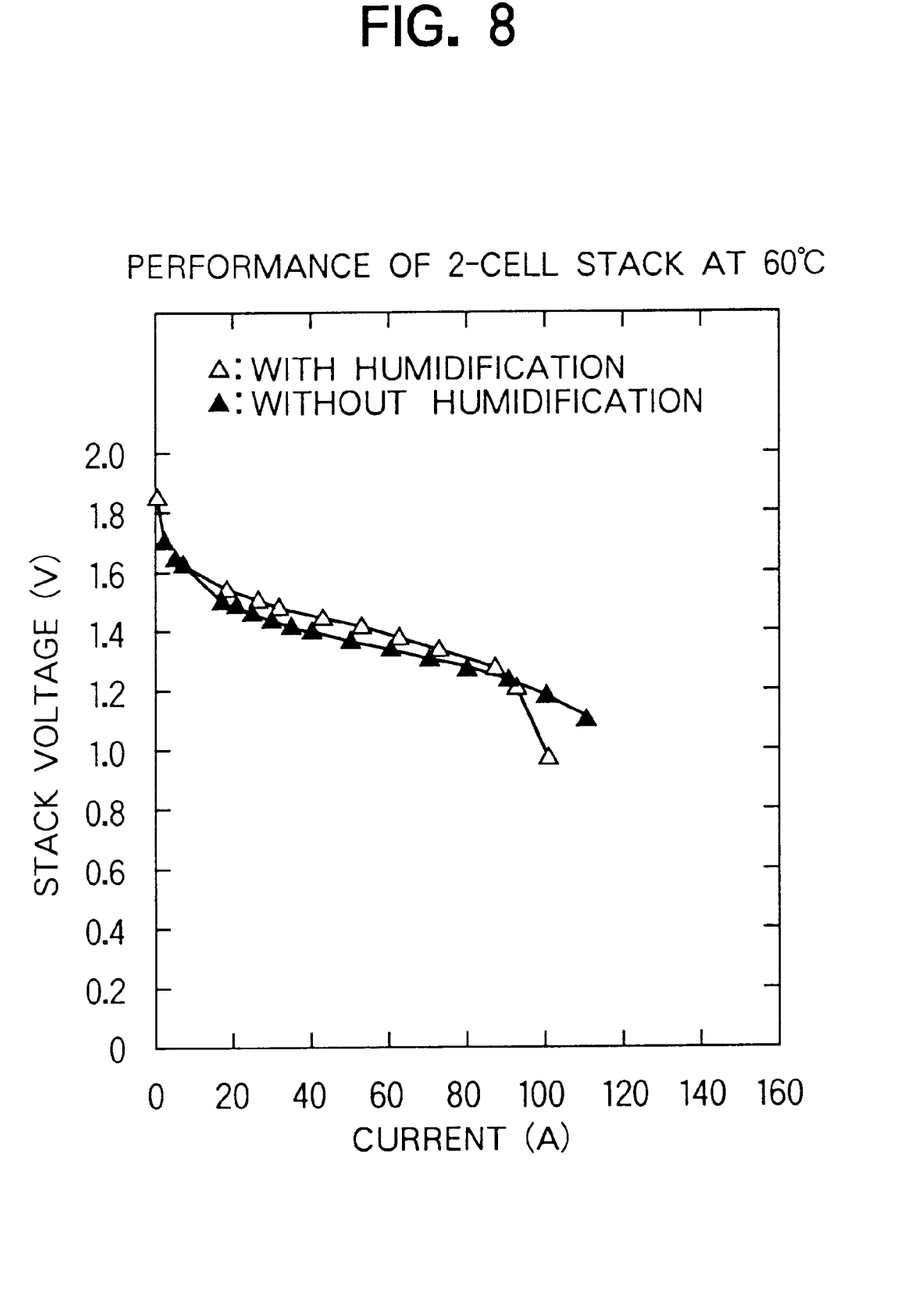
FIG. 8 is a view showing relationships between the electric current and the fuel cell output voltage in an air humidification operation and a non-humidification operation.

Referring to FIG. 8, there are shown the cell performances for the conventional fuel cell with an air humidifier as shown in FIG. 1 and the fuel cell without an air humidifier in accordance with the present invention as shown in FIG. 6 when the operating temperature is 60° C.

According to this result, it is found that there is no deterioration of the cell performance with regard to the fuel cell without air humidifier. Namely, it is possible to operate the fuel cell without humidifying the air and there is no need to dispose the air humidifier in the present invention. As shown in FIG. 7, a higher cell performance can be obtained without the air humidifier in a higher current density condition.

Figure 9:
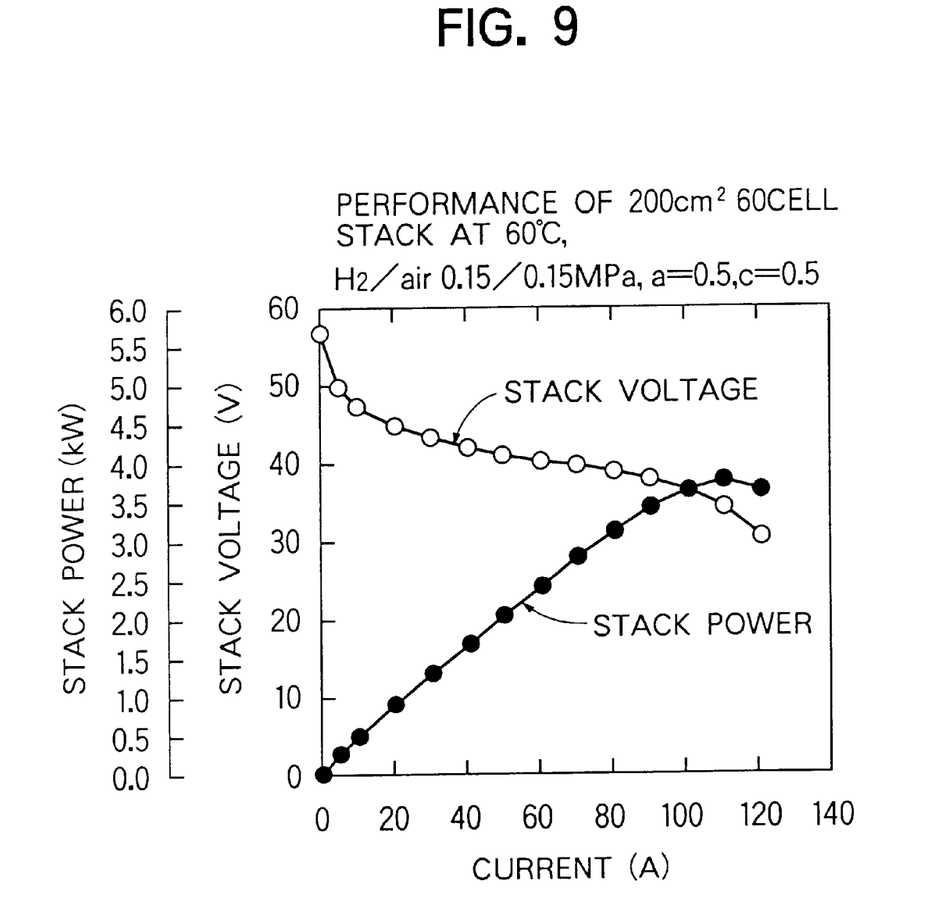
FIG. 9 is a view showing output characteristics of the fuel cell in accordance with the present invention.

In FIG. 9, it is shown a cell performance of a fuel cell employing 200 cm²×60 cell stacks without air humidification. In this case, the hydrogen pressure is about 0.15 MPa. As shown in FIG. 9, the fuel cell generated 3.9 KW in output power and 0.31 KW/l in output power density.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A polymer electrolyte fuel cell comprising;
   a polymer electrolyte membrane,
   an anode catalytic electrode disposed at one side the polymer electrolyte membrane for receiving a fuel gas,
   a humidifier for supplying said fuel gas being supplied to the anode catalytic electrode,
   a cathode catalytic electrode disposed at another side of the polymer electrode for receiving an oxidation gas,
   a supply means for supplying said oxidation gas being supplied to the cathode catalytic electrode without a humidifier, and,
   a temperature control means for controlling a fuel cell operating temperature; so that a reduction amount of water from the cathode catalytic electrode together with the oxidation gas adds a first water amount increased at the cathode catalytic electrode by being transported from the anode catalytic electrode through the polymer electrode membrane during a redox reaction of the fuel cell and a second water amount produced in the cathode catalytic electrode by an oxidation reaction in the cathode catalytic electrode.

2. A polymer electrolyte fuel cell as recited in claim 1 wherein the polymer electrolyte membrane has a thickness of about 20–80 $\mu$m.

3. A polymer electrolyte fuel cell as recited in claim 1 wherein the polymer electrolyte membrane has a thickness of about 20–50 $\mu$m.

4. A polymer electrode fuel cell is recited in claim 1 wherein the temperature control means is adapted to maintain the operating temperature of the fuel cell from about 50° C. to 80° C.

5. A polymer electrode fuel cell is recited in claim 1 wherein the temperature control means is adapted to maintain the operating temperature of the fuel cell at about 60° C.–70° C.

6. A polymer electrode fuel cell is recited in claim 1 wherein said humidifier is adapted to supply hydrogen and said supply means is adapted to supply air.

7. A polymer electrolyte fuel cell as recited in claim 1 wherein the polymer electrolyte membrane is formed with catalyst layers at opposite side, each of the catalyst layer being about 10 $\mu$m in thickness.

8. A polymer electrolyte fuel cell as recited in claim 7 wherein the catalyst layer carries platinum catalytic particles of about 2–4 nm in size on carbon black particles of about 100 nm in size.

9. A polymer electrolyte fuel cell as recited in claim 1, wherein the first water amount is determined based on a water amount transported from the anode to the cathode catalytic electrode side accompanying a proton transportation due to an electrical osmotic flux and a water amount transported from the cathode toward the anode due to a reverse water diffusion flux, the second water amount is a water amount produced in the cathode catalytic electrode due to the transportation to the proton,
   and the thickness of the polymer electrolyte membrane is determined so as to increase the water amount transported from the cathode toward the anode catalytic electrode due to the reverse water diffusion flux under said fuel cell operation temperature.

10. A polymer electrolyte fuel cell comprising;
    a polymer electrolyte membrane having a thickness in a range of about 20 $\mu$m–80 $\mu$m,
    an anode catalytic electrode disposed at one side of the polymer electrolyte membrane for receiving a fuel gas, and
    a cathode catalytic disposed at another side of the polymer electrolyte for receiving an oxidation gas,
    wherein no oxidation gas humidifier is provided and an operating temperature of the fuel cell is to be maintained at about 50° C.–70° C.

11. A polymer electrolyte fuel cell as recited in claim 10 wherein said humidifier is adapted to supply hydrogen and said supply means is adapted to supply air.

12. A polymer electrolyte fuel cell as recited in claim 10 wherein the polymer electrolyte membrane is formed with catalyst layers at opposite side, each of the catalyst layer being about 10 $\mu$m in thickness.

13. A polymer electrolyte fuel cell as recited in claim 12 wherein the catalyst layer carries platinum catalytic particles of about 2–4 nm in size on carbon black particles of about 100 nm in size.

14. A polymer electrolyte fuel cell comprising;
    a polymer electrolyte membrane,
    an anode catalytic electrode disposed at one side the polymer electrolyte membrane for receiving a fuel gas,
    a humidifier for supplying said fuel gas being supplied to the anode catalytic electrode,
    a cathode catalytic electrode disposed at another side of the polymer electrode for receiving an oxidation gas,
    a supply means for supplying said oxidation gas being supplied to the cathode catalytic electrode without a humidifier, and
    temperature control means for controlling a fuel cell operating temperature so that a water supply amount at the anode catalytic electrode is greater than a water amount transported from the anode catalytic electrode through the polymer electrolyte membrane during a redox reaction of the fuel cell.

15. A polymer electrolyte fuel cell as recited in claim 14 wherein the polymer electrolyte membrane has a thickness of about 20–50 $\mu$m.

16. A polymer electrolyte fuel cell as recited in claim 14 wherein the temperature control means is adapted to maintain the operating temperature of the fuel cell about 50° C. to 80° C.

17. A polymer electrolyte fuel cell as recited in claim 14 wherein the temperature control means is adapted to maintain the operating temperature of the fuel cell at about 60° C.–70° C.

18. A polymer electrolyte fuel cell as recited in claim 14 wherein said humidifier is adapted to supply hydrogen and said supply means is adapted to supply.

19. A polymer electrolyte fuel cell as recited in claim 14 wherein the polymer electrolyte membrane is formed with catalyst layers at opposite side, each of the catalyst layer being about 10 $\mu$m in thickness.

20. A polymer electrolyte fuel cell as recited in claim 19 wherein the catalyst layer carries platinum catalytic particles of about 2–4 nm in size on carbon black particles of about 1000 nm in size.

21. A polymer electrolyte fuel cell comprising;
    a polymer electrolyte membrane,
    an anode catalytic electrode disposed at one side the polymer electrolyte membrane for receiving a fuel was, a humidifier for supplying said fuel gas being supplied to the anode catalytic electrode, a cathode catalytic electrode disposed at another side of the polymer electrode for receiving an oxidation gas, a supply means for supplying said oxidation gas being supplied to the cathode catalytic electrode without a humidifier, and, a temperature control means for controlling a fuel cell operating temperature; so that a reduction amount of water from the cathode catalytic electrode together with the oxidation gas adds a first water amount increased at the cathode catalytic electrode by being transported from the anode catalytic electrode through the polymer electrode membrane during a redox reaction of the fuel cell and a second water amount produced in the cathode catalytic electrode by an oxidation reaction in the cathode catalytic electrode wherein a water supply amount at the anode catalytic electrode is greater than a water amount transported from the anode electrode through the polymer electrolyte membrane during a redox reaction of the fuel cell.

22. A polymer electrolyte fuel cell as recited in claim 21 wherein the polymer electrolyte membrane has a thickness of about 20–80 μm.

23. A polymer electro fuel cell as recited in claim 22, wherein the temperature control means is adapted to maintain the operating temperature of the fuel cell at about 60° C.–70° C.

24. A polymer electrolyte fuel as recited in claim 21 wherein said humidifier is adapted to supply hydrogen and said supply means is adapted to supply air.

25. A polymer electrolyte fuel cell as recited in claim 21 wherein the polymer electrolyte membrane is formed with catalyst layers at opposite side, each of the catalyst layer being about 10 μm in thickness.

26. A polymer electrolyte fuel cell as recited in claim 25 wherein the catalyst layer carries platinum catalytic particles of about 2–4 nm in size on carbon black particles of about 100 nm in size.

27. A polymer electrolyte fuel cell comprising;

a polymer electrolyte membrane, an anode catalytic electrode disposed at one side the polymer electrolyte membrane for receiving a fuel gas, a humidifier for supplying said fuel gas being supplied to the anode catalytic electrode, a cathode catalytic electrode disposed at another side of the polymer electrode for receiving an oxidation gas, an oxidation gas supplier for supplying said oxidation gas being supplied to the cathode catalytic electrode without a humidifier, and, a temperature control mechanism to control a fuel cell operating temperature so that a reduction amount of water from the cathode catalytic electrode together with the oxidation as adds a water amount increased at the anode catalytic electrode be transport by a water produced at the anode electrode from the anode catalytic electrode to the cathode catalytic electrode through the polymer electrolyte membrane during a redox reaction of the fuel cell and a water amount produced by an oxidation reaction in the cathode catalytic electrode.

28. A polymer electrolyte fuel cell as recited in claim 27 wherein the temperature control mechanism is adapted to maintain the operating temperature of the fuel cell at about 60° C.–70° C.

29. A polymer electrolyte fuel cell as recited in claim 27 wherein said humidifier is adapted to supply hydrogen and said supplier is adapted to supply air.

30. A polymer electrolyte fuel cell as recited in claim 27 wherein no oxidation gas humidifier is provided.

31. A polymer electrolyte fuel cell as recited in claim 27 wherein the polymer electrolyte membrane is formed with catalyst layers at opposite side, each of the catalyst layer being about 10 μm in thickness.

32. A polymer electrolyte fuel cell as recited in claim 31 wherein the catalyst layer carries platinum catalytic particles of about 2–4 nm in size on carbon black particles of about 100 nm in size.

33. A polymer electrolyte fuel cell comprising;

a polymer electrolyte membrane having a thickness in a range of about 20 μm–80 μm, an anode catalytic electrode disposed at one side the polymer electrolyte membrane for receiving a fuel gas, a humidifier for supplying said fuel gas being supplied to the anode catalytic electrode, a cathode catalytic electrode disposed at another side of the polymer electrode for receiving an oxidation gas, an oxidation gas supplier for supplying said oxidation gas being supplied to the cathode catalytic electrode without a humidifier, and a temperature control mechanism to control a fuel cell operating temperature so that a reduction amount of water from the cathode catalytic electrode together with the oxidation as adds a water amount increased at the anode catalytic electrode being transported by a water produced at the anode electrode from the anode catalytic electrode to the cathode catalytic electrode through the polymer electrolyte membrane during a redox reaction of the fuel cell and a water amount produced by an oxidation reaction in the cathode catalytic electrode.

34. A polymer electrolyte fuel cell comprising;

a polymer electrolyte membrane having a thickness in a range of about 20 μm–80 μm, an anode catalytic electrode disposed at one side the polymer electrolyte membrane for receiving a fuel gas, a humidifier for supplying said fuel gas being supplied to the anode catalytic electrode, a cathode catalytic electrode disposed at another side of the polymer electrode for receiving an oxidation gas, a supply means for supplying said oxidation gas being supplied to the cathode catalytic electrode without a humidifier, and temperature control means for controlling a fuel cell operating temperature so that a water supply amount at the anode catalytic electrode is greater than a water amount transported from the anode catalytic electrode through the polymer electrolyte membrane during a redox reaction of the fuel cell.

* * * * *